US012585427B2

(12) United States Patent
Bayeh et al.

(10) Patent No.: US 12,585,427 B2
(45) Date of Patent: Mar. 24, 2026

(54) VOICE-CUE BASED MOTORIZED SKIN TREATMENT SYSTEM

(71) Applicant: L'Oreal, Paris (FR)

(72) Inventors: Daniel Bayeh, Redmond, WA (US); Jeffrey Kissinger, Redmond, WA (US)

(73) Assignee: L'Oreal, Paris (FR)

( * ) Notice: Subject to any disclaimer, the term of this patent is extended or adjusted under 35 U.S.C. 154(b) by 1456 days.

(21) Appl. No.: 16/541,030

(22) Filed: Aug. 14, 2019

(65) Prior Publication Data

US 2021/0048978 A1     Feb. 18, 2021

(51) Int. Cl.
*G06F 3/16* (2006.01)
*A45D 44/00* (2006.01)
(Continued)

(52) U.S. Cl.
CPC ............. *G06F 3/167* (2013.01); *A45D 44/00* (2013.01); *A47K 7/043* (2013.01); *A61H 7/001* (2013.01); *A61H 2201/5048* (2013.01)

(58) Field of Classification Search
CPC ....... G06F 3/167; A45D 44/00; A45D 44/005; A45D 2044/007; A47K 7/043; A47K 7/04; A61H 7/001; A61H 2201/5048; A61H 2201/0111; A61H 2201/1685; A61H 2201/501; A61H 2201/5012; A61H 2201/5035; A61H 2201/5064; A61H 2201/5097; A61H 2205/022; A61H 2205/024; A61H 7/005; A61H 7/007; A61H 23/0236; A61H 2201/0107;
(Continued)

(56) References Cited

U.S. PATENT DOCUMENTS

2004/0260212 A1* 12/2004 Cho .......................... A61N 1/30
601/72
2015/0148265 A1* 5/2015 Baym .................... A61B 5/486
600/572
(Continued)

FOREIGN PATENT DOCUMENTS

CN        105213160 A        1/2016

OTHER PUBLICATIONS

International Search Report and Written Opinion, mailed Nov. 25, 2020, issued in corresponding International Application No. PCT/US2020/045967, filed Aug. 12, 2020, 12 pages.

*Primary Examiner* — Tu A Vo
*Assistant Examiner* — Kelsey E Baller
(74) *Attorney, Agent, or Firm* — Christensen O'Connor Johnson Kindness PLLC

(57)        ABSTRACT

Voice-cue based motorized skin treatment system is presented. In an embodiment, a skin treatment device includes: an audible instruction unit including memory configured to store a plurality of audio files associated with a plurality of voice cues, and a processor electrically coupled with the memory. The processor is configured to determine which voice cues of the plurality of voice cues are to be audibly presented to a user based one or more inputs indicative of a skin treatment type. An audio unit electrically is coupled with the audible instruction unit. The audio unit is configured to receive the determined voice cues from the processor and to audibly present the determined voice cues, where the determined voice cues include verbal guidance for operating the skin treatment device.

21 Claims, 5 Drawing Sheets

(51) Int. Cl.
    *A47K 7/04*         (2006.01)
    *A61H 7/00*         (2006.01)

(58) Field of Classification Search
    CPC .... A61H 2201/0153; A61H 2201/0157; A61H
              2201/0184; A61H 2201/1418; A61H
              2201/1671; A61H 2201/5028; A61H
              2201/5046; A61H 2201/5071; H04L
              67/125; H04L 67/535; H04B 1/3833
    See application file for complete search history.

(56)              References Cited

U.S. PATENT DOCUMENTS

| | | | |
|---|---|---|---|
| 2015/0305969 A1* | 10/2015 | Giraud | A61H 7/007 |
| | | | 601/84 |
| 2016/0022010 A1* | 1/2016 | Rabe | A61B 5/444 |
| | | | 132/320 |
| 2016/0206087 A1* | 7/2016 | Skidmore | A46B 15/0004 |
| 2017/0172277 A1* | 6/2017 | Mehaddene | A45D 26/0023 |
| 2018/0288160 A1 | 10/2018 | Paul et al. | |
| 2019/0021480 A1 | 1/2019 | Kern | |
| 2019/0070069 A1* | 3/2019 | Gertner | A61H 23/0218 |
| 2020/0268141 A1* | 8/2020 | Newman | H04R 1/028 |

* cited by examiner

*400*

VOICE-CUE BASED MOTORIZED SKIN TREATMENT SYSTEM

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an embodiment, a skin treatment device includes: an audible instruction unit including memory configured to store a plurality of audio files associated with a plurality of voice cues, and a processor electrically coupled with the memory. The processor is configured to determine which voice cues of the plurality of voice cues are to be audibly presented to a user based one or more inputs indicative of a skin treatment type. An audio unit electrically is coupled with the audible instruction unit. The audio unit is configured to receive the determined voice cues from the processor and to audibly present the determined voice cues, where the determined voice cues include verbal guidance for operating the skin treatment device.

In an embodiment, the skin treatment device also includes: a skin treatment effector configured to be in contact with the skin surface; and an electromechanical actuator operably coupled with the skin treatment effector. The electromechanical actuator is configured to cause the skin treatment effector to move relative to the skin surface in a particular movement pattern and for a particular time duration.

In an embodiment, the skin treatment effector includes a mechanism that identifies a skin treatment type, and the audible instruction unit is configured to detect the mechanism upon attachment of the skin treatment effector to the device.

In an embodiment, the audible instruction unit includes a processor configured to determine which voice cues of the plurality of voice cues to be audibly presented to a user based one or more inputs indicative of a sensitive cleanse treatment, a deep cleanse treatment, a pore cleanse treatment, a normal cleanse treatment, an eye area massage treatment, a facial massage treatment, a make-up application treatment, a skin rejuvenation, or a skin stimulation treatment.

In an embodiment, the audible instruction unit is operably coupled to one or more Hall effect sensors and is configured to determine which voice cues of the plurality of voice cues to be audibly presented to a user based one or more inputs indicative of a magnetic field profile associated with a skin treatment effector.

In an embodiment, the audible instruction unit is operably coupled to one or more proximity sensors and is configured to determine a skin treatment type and a voice cue set to be audibly presented to a user for a detected skin treatment effector.

In an embodiment, the audio unit includes a structure having one or more openings sized and dimensioned to minimized external penetration.

In an embodiment, the one or more openings are less than 1 millimeter (mm) or less than 2.5 mm.

In an embodiment, an external surface of the audio unit includes a hydrophobic material.

In an embodiment, the audible instruction unit further includes: one or more of a filter, an amplifier, a volume controller, a low pass filter, or an electromagnetic interference (EMI) filter electrically coupled between the processor and the speaker.

In an embodiment, the skin treatment device includes a user interface configured to enable a user-selected skin treatment type input.

In an embodiment, the audible instruction unit is configured to determine which voice cues of the plurality of voice cues to be audibly presented to the user based on a detected skin treatment effector and one or more inputs indicative of user history or behavior.

In an embodiment, the audible instruction unit includes a processor configured to determine which voice cues of the plurality of voice cues to be audibly presented to the user based on the indication of the skin treatment effector and user defined preferences.

In an embodiment, the audible instruction unit includes a processor configured to determine which voice cues of the plurality of voice cues to be audibly presented to the user based on the indication of skin treatment type and time of day.

In an embodiment, the audible instruction unit includes a processor configured to determine which voice cues of the plurality of voice cues to be audibly presented to the user based on the indication of skin treatment type and day of the week.

In an embodiment, the audible instruction unit includes a processor configured to determine which voice cues of the plurality of voice cues to be audibly presented to the user based on the indication of skin treatment type treatment and behavior of a plurality of users.

In an embodiment, the audible instruction unit is configured to determine which voice cues of the plurality of voice cues to be audibly presented to a user based one or more inputs indicative of a detected skin treatment effector and one or more inputs indicative of a user-specific choice profile.

In an embodiment, a method skin treatment includes: generating particular voice cues of a plurality of digital voice cues stored in memory based on at least an indication of skin treatment type; audibly presenting the determined particular digital voice cues during use of a skin treatment device on a skin surface; and monitoring a device compliance response associated with the audibly presented particular voice cues.

In an embodiment, the method also includes: determining a compliance profile associated with the audibly presented particular voice cues; and providing audio or haptic feedback, during use of the skin treatment device, in accordance with the determined compliance profile.

In an embodiment, generating the particular voice cues includes detecting a skin treatment effector and determining the particular voice cues based on a skin treatment type associated with the detected skin treatment effector and one or more inputs indicative of a user preference associated with a time of day, day of the week, user behavior, user history, a pre-defined preferences, or a crowdsourced behavior preference.

In an embodiment, audibly presenting the determined particular digital voice cues includes audibly presenting digital audio guidance for using the skin treatment device during use.

In an embodiment, the method also includes causing a skin treatment effector to move in a particular pattern for a particular time duration concurrently with audibly presenting the determined particular voice cues.

In an embodiment, generating the particular voice cues of the plurality of digital voice cues stored in memory based on at least an indication of skin treatment type includes generating particular voice cues of a plurality of digital voice cues stored in memory based on at least an indication of a sensitive cleanse, a deep cleanse, a pore cleanse, a normal cleanse, an eye area massage, a facial massage, a make-up application, a skin rejuvenation, or a skin stimulation.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
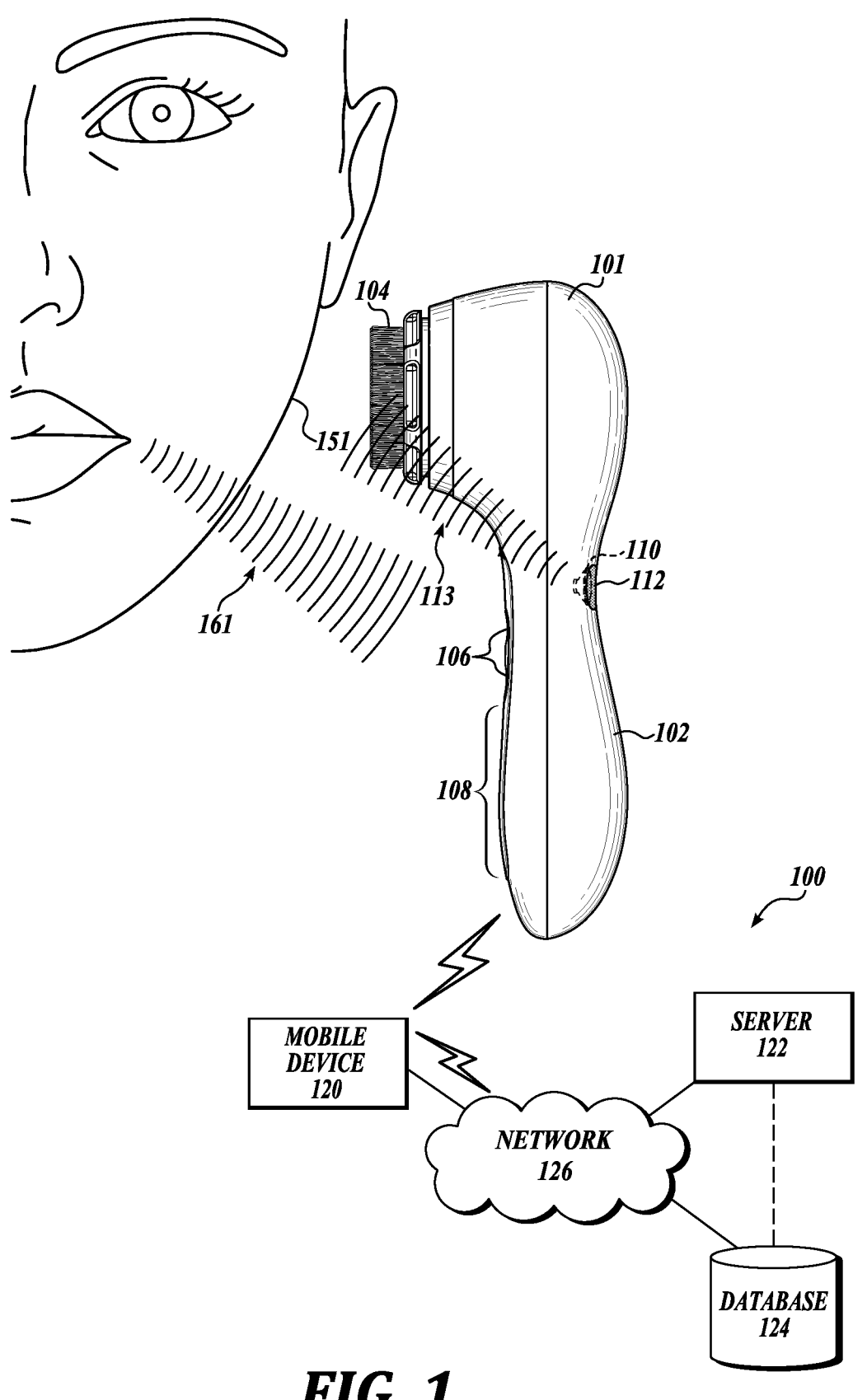
FIG. 1 depicts an example system 100 implementing voice-cue based skin treatment techniques in accordance with an embodiment of the present disclosure.

Embodiments of a system, apparatus, and method for voice-cue based motorized skin treatment schemes are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

FIG. 1 depicts an example system 100 implementing voice-cue based motorized skin treatment techniques in accordance with an embodiment of the present disclosure. Various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes a device 101, a mobile device 120, a server 122, a database 124, and a network 126. Each of server 122, database 124, and mobile device 120 is in wired and/or wireless communication with the network 126.

Mobile device 120 comprises one or more mobile computing devices comprising, but not limited to, smart phones, laptops, tablets, personal computers, general purpose computers, Internet appliances, hand-held devices, wireless devices, wired devices, wearable devices, cellular or mobile phones, portable digital assistants (PDAs), multi-processor systems, microprocessor-based or programmable consumer electronics, game consoles, set-top boxes, network PCs, mini-computers, and/or the like. Mobile device 120 includes applications, software, firmware, and/or other executable instructions to facilitate various aspects of the techniques described herein. Mobile device 120 may also include additional applications or other interface capabilities to communicate with the server 122, database 124, and/or device 101.

In an embodiment, mobile device 120 is configured to communicate with device 101 and provide processing, storage, and/or other functionalities that may not be available at device 101. For example, device 101 may not include communication components capable of communicating with server 122 or database 124. Mobile device 120 can serve as a communication intermediary between the device 101 and server 122/database 124. As another example, device 101 may have limited storage capacity and hence only able to store a limited number of voice-cue sets or limited device use history data. Mobile device 120 having a larger storage capacity can store a larger number of voice-cue sets and a complete device use history data, which may be accessed by the device 101 as needed.

Server 122 comprises one or more servers, computers, processors, webpage servers, database servers, and/or computing devices configured to communicate with the device 101, mobile device 120, and/or database 124. Server 122 hosts one or more applications, websites, social networks, and/or the like related to techniques and data described in detail herein. Server 122 may comprise an intermediating mechanism to another server or service assessed by device 101 and/or mobile device 120. Although one server 122 is shown in FIG. 1, system 100 may, depending on the embodiment, comprise one, two, or any number of servers 122, which may work alone and/or collectively to provide the functionality described herein.

Database 124 comprises one or more databases, data stores, or storage devices configured to store and maintain voice cue audio files, user profiles, user history, data derived from user profiles and/or user history, user feedback, and/or instructions for use by server 122, device 101, and/or mobile device 120. Database 124 may, in an embodiment, be located at one or more geographically distributed locations relative to server 122. Server 122 and database 124 may be accessed via network 126. In an embodiment, server 122 and database 124 can communicate with each other without use of network 126. In an embodiment, database 124 may be included in server 122.

Network 126 comprises a wired or wireless communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. If network 126 comprises a public network, security features (e.g., VPN/SSL secure transport) may be included to ensure authorized access within system 100.

Device 101 comprises a portable (e.g., handheld) device configured to facilitate application, stimulation, rejuvenation, cleansing, and/or perform other actions to a skin of user 151, and/or other structures proximate to the user's skin. Device 101 comprises an outlet or battery powered device, and may have an inactive/off state and one or more active/on states. Device 101 includes a base 102, an attachment head 104, interface mechanisms 106 and 108, a speaker 110, and a speaker cover 112.

In an embodiment, attachment head 104 is configured to physically and electrically couple with base 102. Attachment head 104 may comprise any of a variety of attachment heads configured for different purposes such as, but not limited to, sensitive cleansing, deep cleansing, pore cleansing, normal cleansing, eye area massaging, facial massaging, make-up application, skin rejuvenation, stimulation, and/or the like. Accordingly, attachment head 104 may comprise a brush, one or more massaging/stimulation protrusions, particularly contoured surfaces, and/or the like. Attachment head may also be referred to as a skin contacting component, a skin treatment component, a skin treatment head, and/or the like. When coupled with base 102, base 102 is configured to cause the attachment head 104 to move in a particular pattern or interact with the user's skin in a particular way as described in detail herein. Base 102 may also be configured to serve as a handle of the device 101.

Interface mechanisms 106 and 108 can be provided on a side of the base 102. For example, without limitation, interface mechanisms 106 comprise buttons or other actuators that can be used by the user to command the device 101 to be on a particular state (e.g., inactive/off state, active/on state, etc.) and interface mechanism 108 comprises a display to visually present information to the user.

In operation, the device 101 and user 151 can exchange voice cues (illustrated as audio waves 161 emitted by the user 151, and audio waves 113 emitted by a speaker 110). Speaker 110 can also be provided on a side of the base 102 (e.g., on a side different from the side including interface mechanisms 106 and 108) and at a location where the speaker output is unlikely to be blocked by the user's hand. Speaker cover 112 is provided at the speaker output to reduce or eliminate debris and other undesirable material from entering the speaker.

In an embodiment, data communicated between components included in system 100, especially data associated with a user, is encrypted, anonymized, and/or in compliance with Health Insurance Portability and Accountability Act (HIPAA) and General Data Protection Regulation (GDPR).

Figure 2A:
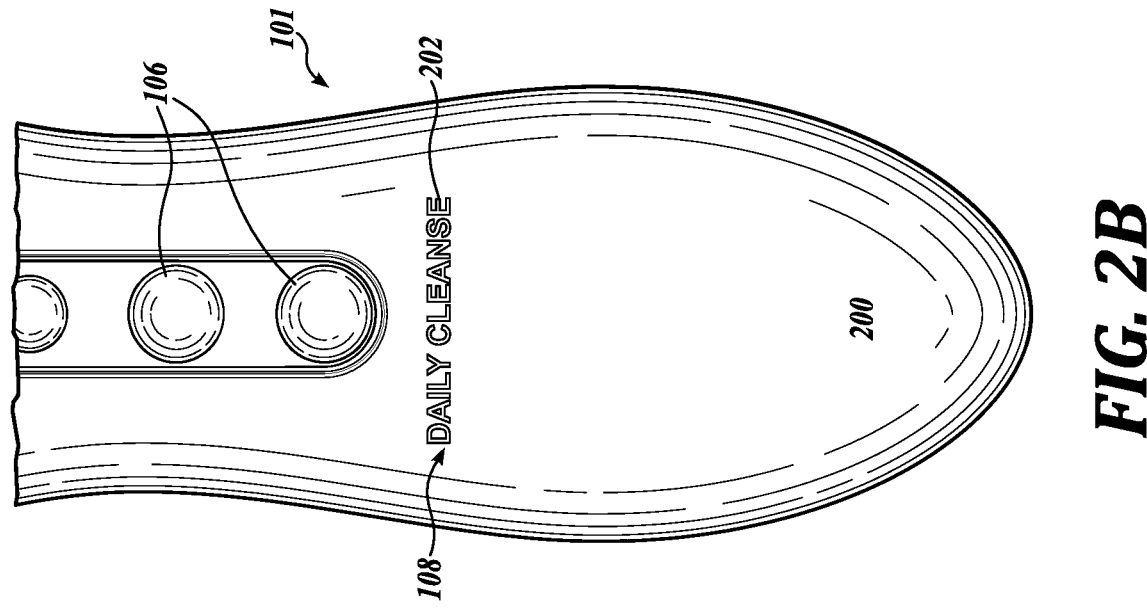
FIGS. 2A-2C depict details of a portion of a device in accordance with an embodiment of the present disclosure.
Figure 2B:
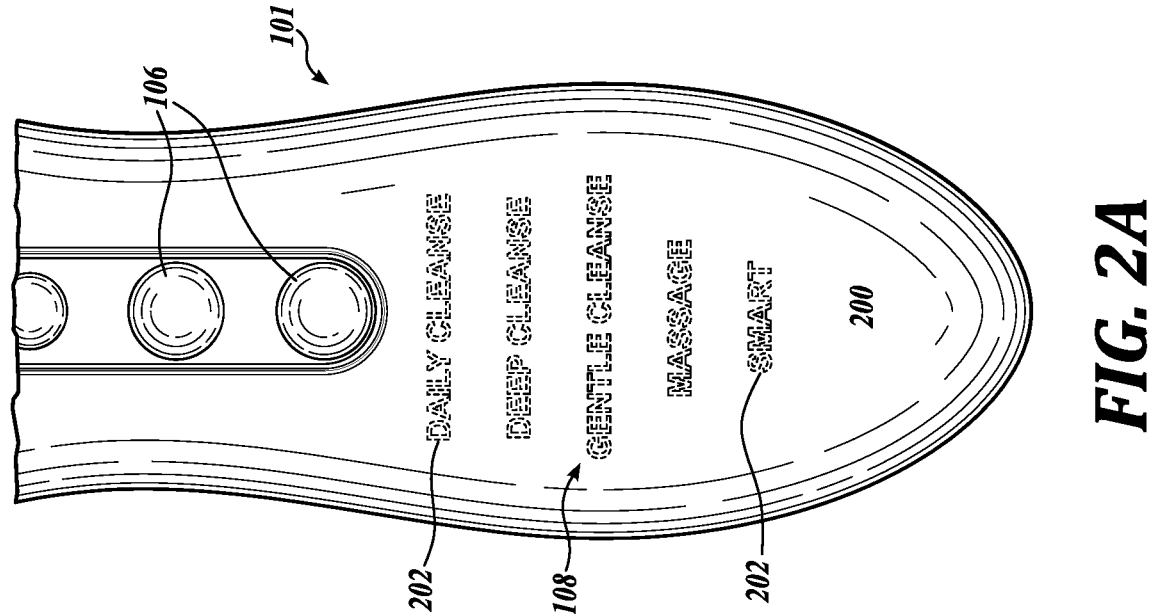
Figure 2C:
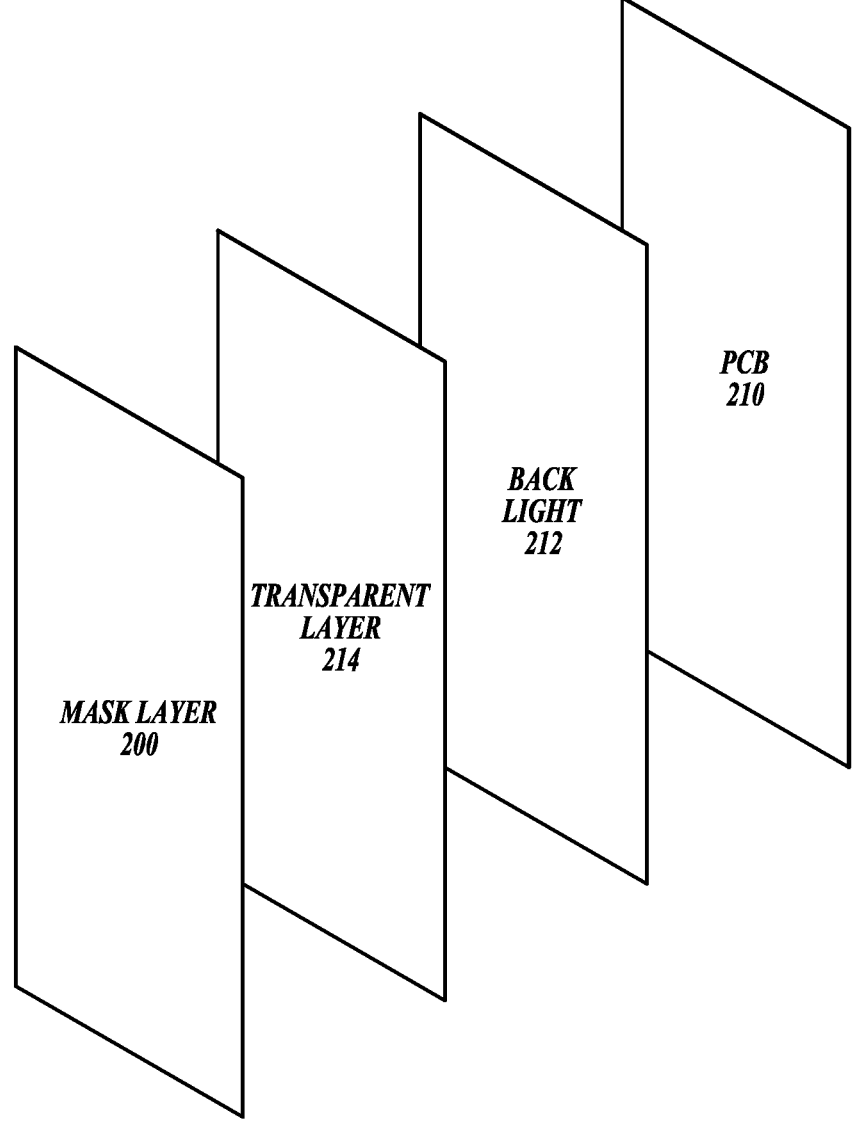

FIGS. 2A-2C depict details of a portion of the device 101 in accordance with an embodiment of the present disclosure. In an embodiment, interface mechanism 108 includes a mask layer 200, a transparent layer 214, a back light 212, and a printed circuit board (PCB) 210, as shown in FIG. 2C. At least a portion of the mask layer 200 is provided on a surface of the base 102 proximate to the interface mechanisms 106, as shown in FIGS. 2A-2B. The transparent layer 214, back light 212, and PCB 210 are provided inside the base 102. The transparent layer 214 is disposed between the mask layer 200 and back light 212, and back light 212 is disposed between the transparent layer 214 and PCB 210. One or more of the mask layer 200, transparent layer 214, back light 212, and PCB 210 are electrically coupled with each other.

PCB 210 comprises electrical circuitry, components, processor, and/or the like configured to control display of visual information on the interface mechanism 108. PCB 210 controls, without limitation, the actuation of selective portion(s) of the back light 212 so as to cause select text included in the mask layer 200 to be visible or invisible to the user. In FIG. 2A, all of the text 202 included in the mask layer 200 that can be displayed is shown. As an example, text 202 can denote different operational states of the device 101 such as, but not limited to: daily cleanse, deep cleanse, gentle cleanse, massage, smart, and/or the like. FIG. 2B illustrates configuring the back light 212 so as to cause only a particular portion of the text 202 (e.g., "deep cleanse") to be visible to the user. Such particular portion of the text 202 may be displayed in response to selection of deep cleanse mode by a user via interface mechanisms 106.

Figure 3:
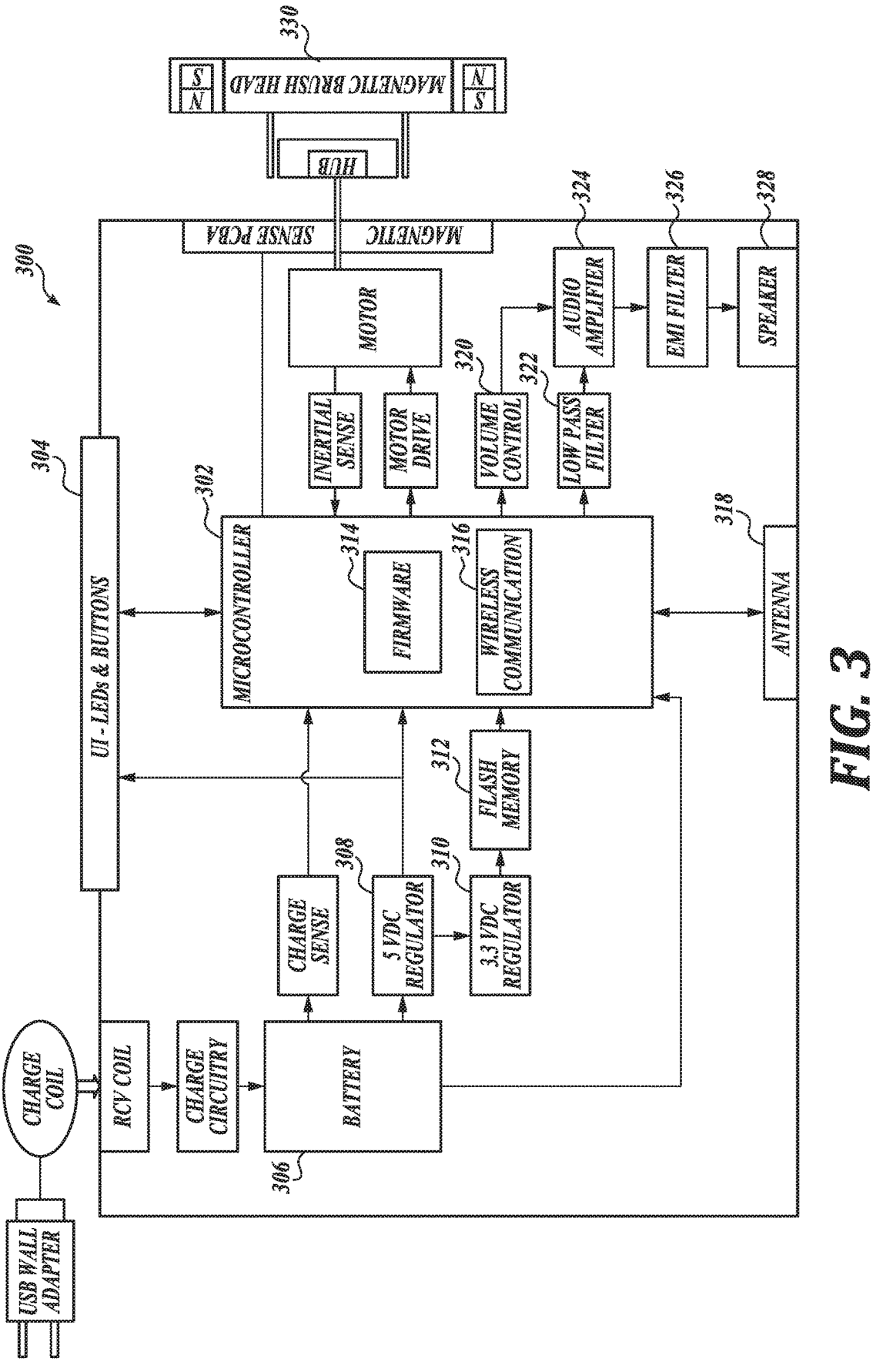
FIG. 3 depicts a block diagram of a device capable of voice-cue based techniques in accordance with an embodiment of the present disclosure.

FIG. 3 depicts a block diagram of a device 300 capable of voice-cue based techniques in accordance with an embodiment of the present disclosure. In an embodiment, device 300 comprises an example of at least a portion of device 101. Device 300 includes, without limitation, a microcontroller 302, user interface mechanisms 304, a battery 306, voltage regulators 308, 310, a memory 312, an antenna 318, a volume controller 320, a filter 322, an amplifier 324, a filter 326, a speaker 328, and an attachment head 330.

In an embodiment, microcontroller 302 comprises a processor, controller, computer, or computing unit. Microcontroller 302 is configured to control communications with devices external to device 300, such as with mobile device 120 via antenna 318, and facilitate various interactions with the user such as, but not limited to, providing particular voice-cues to the user via speaker 328, collection of user-related data, displaying information to or interfacing with the user via user interface mechanisms 304, and/or the like. Microcontroller 302 includes firmware 314 and wireless communication component(s) 316, such as, but not limited to, a transmitter, receiver, transceiver, Bluetooth radio, WiFi transceiver, and/or the like.

User interface mechanisms 304 are electrically coupled with microcontroller 302. User interface mechanisms 304 comprise, for example, interface mechanisms 106 and 108.

In an embodiment, battery 306 stores electrical energy to permit device 300 to operate without a wired/line connection to a power source, such as a wall outlet. Battery 306 may be optional if device 300 is configured to be powered by a wired power source. The stored electrical energy in the battery 306 powers the other components included in the device 300, including microcontroller 302 via voltage regulator 308 and memory 312 via voltage regulator 310. Voltage regulator 308 is electrically coupled between battery 306 and microcontroller 302. Voltage regulator 308 may comprise a voltage regulator configured to convert the voltage outputted from battery 306 into a 5 Volt direct current (VDC) suitable for the microcontroller 302. Voltage regulator 310 is electrically coupled between battery 306 and memory 312. Voltage regulator 310 may comprise a voltage regulator configured to convert the voltage outputted from batter7 306 into a 3.3 VDC suitable for the memory 312.

Memory 312 comprises one or more storage devices such as, but not limited to, flash memory. Memory 312 is configured to store a plurality of audio files associated with a plurality of voice-cue based device usage modes. The plurality of voice-cue based device usage modes may be associated with the plurality of different types of attachment heads, user customized device usage modes, community-based customized device usage modes, and/or the like. For example, one or more voice-cue based device usage modes may exist for each of the daily cleanse, deep cleanse, gentle cleanse, massage, smart, and/or the like operational states of the device. As another example for the daily cleanse operational state, a first voice-cue based scheme may comprise the default or nominal daily cleanse voice-cues, a second voice-cue based scheme different from the first voice-cue based scheme may comprise a customized version of the default/ nominal daily cleanse voice-cues that is customized to a first user of device 300, a third voice-cue based scheme different from the first and second voice-cue based schemes may comprise a customized version of the default/nominal daily cleanse voice cues that is customized to a second user of device, a fourth voice-cue based scheme different from the first, second, and third voice-cue based schemes may comprise a community-based version of the default/nominal daily cleanse voice cues (e.g., based on customizations of the default/nominal daily cleanse operational state by a plurality of users), and/or the like.

In an embodiment, each audio file of the plurality of audio files may comprise all the voice-cues for a particular usage mode, less than all the voice-cues for a particular usage mode, a word, a phrase, a sentence, a plurality of sentences, sounds, and/or the like. If less than the entire sequence of voice-cues for a usage mode is provided in a given audio file, then microcontroller 302 may be configured to assemble the entire sequence using more than one audio file at run-time.

Memory 312 and/or microcontroller 302 can include computer- or machine-executable instructions stored in a non-transitory computer-readable medium to facilitate use of the plurality of audio files, in which the instructions are executed by the microcontroller 302 to access, assemble, configure, and/or otherwise provide appropriate voice-cues to be outputted by speaker 328. In an embodiment, some or all of the plurality of audio files may be stored in microcontroller 302.

Attachment head 330 may comprise, for example, attachment head 104. In an embodiment, the usage mode may be automatically determined when the attachment head 330 is coupled to the base of device 300, based on detection of the particular type of attachment head. For example, attachment head 330 may include magnetic components arranged in a particular configuration to identify the type of attachment head. When attachment head 330 is coupled to the device base, then the magnetic component configuration sensor may transmit sensed information to microcontroller 302. In turn, microcontroller 302 knows which set of voice-cues associated with a particular usage mode to provide to the user. Depending on user specified preferences, the default/ nominal, user customized, community customized, or other particular version of the particular usage mode may be provided, as will be described in detail below.

The voice cue data outputted by microcontroller 302 is signal processed by one or more of volume controller 320, filters 322, 326, and amplifier 324 appropriate for outputting by speaker 328. In an embodiment, volume controller 320 is electrically coupled between microcontroller 302 and amplifier 324. Amplifier 324 is electrically coupled between volume controller 320 and filter 226. Filter 326 is electrically coupled between amplifier 324 and speaker 328. Filter 322 is arranged in parallel with volume controller 320, and is electrically coupled between microcontroller 302 and amplifier 324. For example, filter 322 may comprise a low pass filter and filter 326 may comprise an electromagnetic interference (EMI) filter. Speaker 328 may comprise speaker 110. Although not shown, a speaker cover, similar to cover 112, may be provided over speaker 328.

In an embodiment, a hole or opening diameter associated with speaker 328 can be less than one millimeter (mm), less than 2.5 mm, and/or the like. The opening of speaker 328 and/or a cover provided over speaker 328 can comprise a hydrophobic surface to repel moisture, liquids, water, and/or the like.

Figure 4:
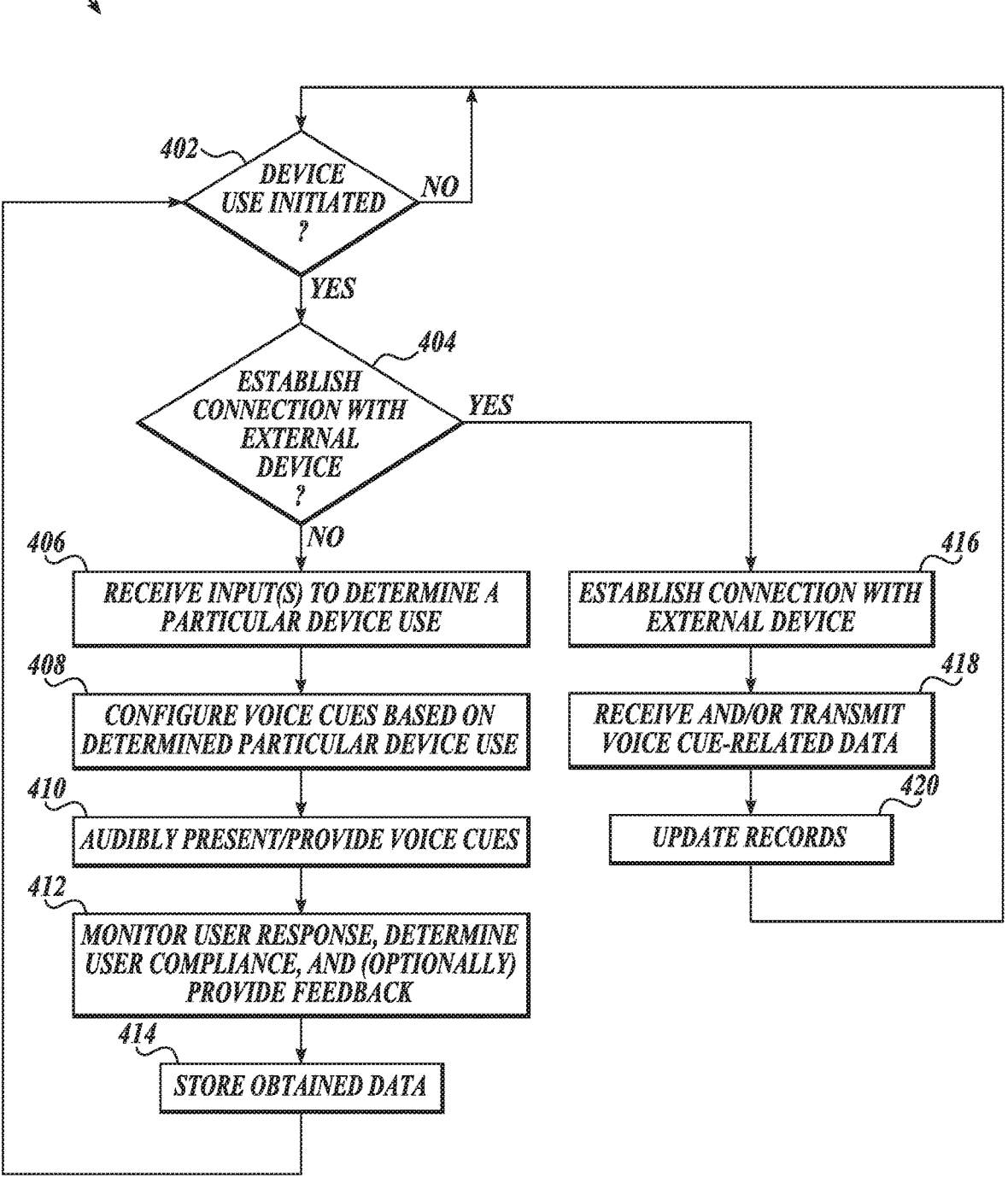
FIG. 4 depicts an example illustration of a process performed by the device of FIG. 3 in association with presentation of voice cues in accordance with an embodiment of the present disclosure.

FIG. 4 depicts an example illustration of a process 400 performed by device 300 in association with presentation of voice cues in accordance with an embodiment of the present disclosure. At a block 402, microcontroller 302 awaits initiation of use of the device 300 by a user (e.g., indication of a usage mode, operational state, type of cleansing, type of massage, application type, etc.). If device 300 remains in an inactive or off state or the user has not otherwise indicated operation of the device 300 (no branch of bock 402), then microcontroller 302 continues to monitor for an actuation indication. In an embodiment, even if the user does not specify a particular usage mode, turning the device on may be sufficient for the microcontroller 302 to automatically determine a particular usage mode and accordingly, the appropriate voice cues, based on, for example, the time of day, user history, day of week, and/or the like. In an embodiment, the user may be able to pre-configure device 300 as to when a device use may be deemed to be initiated (e.g., only upon user input of a usage mode selection, upon turning on of the device, etc.).

If a device use is deemed to be initiated (yes branch of block 402), then process 400 proceeds to block 404. At block 404, microcontroller 302 is configured to check whether to establish a connection with an external device, such as mobile device 120, a server or database connected to the Internet, and/or the like. If no connection is to be established (no branch of block 404), then process 400 proceeds to block 406.

At block 406, microcontroller 302 is configured to receive or obtain one or more inputs to determine a particular usage mode (also referred to as a particular device use) associated with particular voice cues or set of voice cues. The particular usage mode can be determined based on one or more inputs/factors such as, but not limited to: a usage mode specified by the user via a selection on the interface mechanisms 304 (e.g., selecting "deep cleanse"), user history, user defined preferences, time of day, day of the week, past user behavior, user customizations, community-based customizations, community-based popular customizations, type of attachment head, and/or the like.

For example, in previous sessions by the user of the "deep cleanse" routine, device 300 logged the user's actual behavior or response to the voice cues associated with the default/ nominal "deep cleanse" routine. The user tended to stop the routine prior to completion. Such user behavior or history for the "deep cleanse" routine may be a factor in future voice cues when the "deep cleanse" routine is again selected. Device 300 may suggest selection of another routine, such as the "gentle cleanse" routine because the user may have prematurely stopped the "deep cleanse" routine because it was too harsh for his or her skin. Or if the user tended to extend the routine by about one minute each time, voice cues for future "deep cleanse" routines may be customized from the default/nominal "deep cleanse" routine to extend the default/nominal routine by another minute.

With the particular voice cues determined, microcontroller 302 obtains the appropriate audio file(s) associated with the particular voice cues from memory 312 and/or within its own memory, at a block 408. Microcontroller 302 then configures the voice cues, such as assembling the audio files, adding customizations to the default/nominal set of voice cues, and/or the like.

Voice cues are also referred to as verbal guidance, utterances, or instructions. Voice cues may comprise pre-recorded or computer-generated verbal guidance or utterances. Voice cues may differ from non-verbal sounds (such as beeps or chirps) or haptic guidance (e.g., vibrations). Verbal guidance provides more information for improved user experience, device effectiveness, user engagement, and/or the like.

The particular voice cues are then processed by audio drive electronic components (e.g., filters 322, 326, amplifier 324, volume controller 320) and then provided to speaker 328. In turn, speaker 328 is configured to output or provide the voice cues to the user, at a block 410.

For instance, voice cues of an example cleansing routine may be as follows:

Squirt your favorite facial cleanser on the side of the cleansing brush to be placed on your skin.

Place the cleansing brush on your forehead and move the brush in a circular motion on your forehead.

(After 30 seconds)

Move the cleansing brush to the left cheek area. Move the brush in a circular motion in the left cheek area.

(After 30 seconds)

Move the cleansing brush to the right cheek area. Move the brush in a circular motion in the right cheek area.

(After 30 seconds)

Move the cleansing brush to your chin or nose. Move the brush in a circular motion on your chin and nose area.

(After 30 seconds and if during daylight hours)

All done! You have completed cleansing your face. Don't forget to put on sunblock.

At a block 412, device 300 is configured to monitor the user's response or compliance with the provided verbal guidance and optionally provide real-time (or near real-time) feedback to the user. Device 300 may provide haptic feedback, for example, as to how the user is complying with the verbal guidance. Referring to FIG. 3, microcontroller 302 may be configured to actuate a motor included in the device 300, which in turn causes the base and/or the attachment head 330 to vibrate. In an embodiment, voice cues provided at block 410 may be adjusted in accordance with the user's response detected at block 412.

Simultaneous with performance of blocks 410 and/or 412, device 300 is configured to capture and store data associated with the user's response to the provided voice cues, at a block 414. Such stored data contributes to the user's behavior data, user's history data, community data, and/or the like. If the voice cues comprise customized voice cues, such customizations may also be stored at block 414 for the user and/or community's future use.

Next, process 400 returns to block 402 to await another device use initiation indication.

At block 404, if there is an indication to establish connection with an external device (yes branch of block 404), then process 400 proceeds to block 416. At a block 416, microcontroller 302 is configured to control the wireless communication component 316 and antenna 318 to establish wireless connection with a particular external device, such as mobile device 120, which in turn, is capable of connecting with the Internet or other network. In an embodiment, the connection may be automatic via an automatic pairing protocol based on proximity to the external device (and a previous connection set up).

With the connection established with a desired external device, device 300 is configured to transmit and/or receive data with the external device, in particular, voice cue-related data, at a block 418. Received data can include new or additional audio files of voice cues. Memory 312 may be limited in capacity and thus, a limited subset of the available plurality of audio files may be stored in it at any given time. If the device use indication at block 402 is of a use for which no or incomplete audio files are stored in memory 312, for example, then a connection with the external device can be used to obtain the needed audio files. An example of transmitted data can include user behavior data, user customizations, user preferences, and/or the like that can be uploaded to contribute to community-level data.

In an embodiment, the external device may include a larger display and additional user interface mechanisms (e.g., touch screen, additional buttons, voice input mechanisms, etc.) to receive user preferences, user selections, and/or perform other activities related to skin treatments provided by the device 300.

At a block 420, records are updated as needed at device 300 based on actions taken in connection with block 418. Process 400 then returns to block 402 for the next device use initiation indication.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A skin treatment device comprising:

an audible instruction unit including a memory configured to store a plurality of audio files associated with a plurality of voice cues, and a processor electrically coupled with the memory, the processor configured to;

receive one or more inputs to determine a usage mode, the one or more inputs comprising:

a user voice cue generated by a user and received by a processor, a sensed configuration of the device from a magnetic component configuration sensor, a logged user history stored in the memory, and one or more of:

a time of the day, a day of the week, a pre-defined user preference, and a crowdsource behavior preference;

generate a customized output voice cue file for the usage mode by assembling more than one audio files of the plurality of audio files stored in the memory, wherein the customized output voice cue is based on the determined usage mode;

based on the output voice cue file, audibly present the customized output voice cue to the user through a speaker during use of a skin treatment device on a skin surface;

monitor a device compliance response associated with the audibly presented customized output voice cue;

provide a modified customized output voice cue based on the device compliance response; and capture and store data in the memory associated with the user's response to the customized output voice cue and the modified customized output voice cue to generate an updated user history; and the speaker electrically coupled with the audible instruction unit, the speaker configured to receive the customized output voice cue from the processor and to audibly present the customized output voice cue to the user, wherein the customized output voice cue includes verbal guidance for operating the skin treatment device.

2. The device of claim 1, further comprising:

a skin treatment effector configured to be in contact with a skin surface; and a base operably coupled with the skin treatment effector, the base being configured to cause the skin treatment effector to move relative to the skin surface in a particular movement pattern and for a particular time duration.

3. The device of claim 2, wherein the base is configured for identifying the skin treatment effector, and wherein the audible instruction unit is configured to determine which audio files of the plurality of audio files to be audibly presented to the user based on detected skin treatment effector.

4. The device of claim 1, wherein the audible instruction unit includes the processor configured to determine which audio files of the plurality of audio files to be audibly presented to the user based on the one or more inputs indicative of a sensitive cleanse treatment, a deep cleanse treatment, a pore cleanse treatment, a normal cleanse treatment, an eye area massage treatment, a facial massage treatment, a make-up application treatment, a skin rejuvenation, or a skin stimulation treatment.

5. The device of claim 1, wherein the skin treatment effector is a magnetic brush head that is configured to determine which audio files of the plurality of audio files to be audibly presented to the user based on the one or more inputs indicative of a magnetic field profile associated with a skin treatment effector.

6. The device of claim 1, wherein the audible instruction unit is configured to determine the one or more skin treatments to be executed and which audio files of the plurality of audio files set to be audibly presented to the user for a detected skin treatment effector.

7. The device of claim 1, wherein the speaker includes a structure having one or more openings sized and dimensioned to minimize external penetration.

8. The device of claim 7, wherein the one or more openings are less than 1 millimeter (mm) or less than 2.5 mm.

9. The device of claim 1, wherein an external surface of the speaker comprises a hydrophobic material.

10. The device of claim 1, wherein the audible instruction unit further comprises:

one or more of a filter, an amplifier, a volume controller, a low pass filter, or an electromagnetic interference (EMI) filter electrically coupled between the processor and the speaker.

11. The device of claim 1, wherein the skin treatment device includes a user interface configured to enable a user-selected skin treatment input.

12. The device of claim 1, wherein the audible instruction unit is configured to determine which audio files of the plurality of audio files to be audibly presented to the user based on a detected skin treatment effector and the one or more inputs indicative of user history or behavior.

13. The device of claim 1, wherein the audible instruction unit includes the processor configured to determine which audio files of the plurality of audio files to be audibly presented to the user based on an indication of the skin treatment effector and the user preferences.

14. The device of claim 1, wherein the audible instruction unit includes the processor configured to determine which audio files of the plurality of audio files to be audibly presented to the user based on an indication of skin treatment and the time of day.

15. The device of claim 1, wherein the audible instruction unit includes the processor configured to determine which audio files of the plurality of audio files to be audibly presented to the user based on an indication of skin treatment and behavior of a plurality of users.

16. The device of claim 1, wherein the audible instruction unit is configured to determine which audio files of the plurality of audio files to be audibly presented to the user based on the one or more inputs indicative of a detected skin treatment effector and the one or more inputs indicative of a user-specific choice profile.

17. A method comprising:

receiving one or more inputs to determine a usage mode, the one or more inputs comprising:

a user voice cue generated by a user and received by a processor, a sensed configuration of the device from a magnetic component configuration sensor, a logged user history, and one or more of:

a time of the day, a day of the week, a pre-defined user preference, and a crowdsource behavior preference;

generating a customized output voice cue file for the usage mode by assembling more than one audio files of a plurality of audio files stored in a memory, wherein the customized output voice cue is based on the determined usage mode;

based on the output voice cue file, audibly presenting the customized output voice cue to the user through a speaker during use of a skin treatment device on a skin surface;

monitoring a device compliance response associated with the audibly presented customized output voice cue;

providing a modified customized output voice cue based on the device compliance response; and capturing and storing data associated with the user's response to the customized output voice cue and the modified customized output voice cue to generate an updated user history.

18. The method of claim 17, further comprising:

determining a compliance profile associated with the audibly presented generated audio file; and providing audio or haptic feedback, during use of the skin treatment device, in accordance with the determined compliance profile.

19. The method of claim 17, wherein audibly presenting the generated audio file through the speaker includes audibly presenting digital audio guidance for using the skin treatment device during use.

20. The method of claim 17, further comprising causing a skin treatment effector to move in a particular pattern for a particular time duration concurrently with audibly presenting the generated audio file.

21. The method of claim 17, wherein generating the audio files of the plurality of audio files stored in a memory based on at least an indication of skin treatment includes generating audio files of the plurality of audio files stored in the memory based on at least an indication of a sensitive cleanse, a deep cleanse, a pore cleanse, a normal cleanse, an eye area massage, a facial massage, a make-up application, a skin rejuvenation, or a skin stimulation.

\* \* \* \* \*